United States Patent [19]
Rickey et al.

[11] 3,895,289
[45] July 15, 1975

[54] DETERMINATION OF ELECTRICAL RESISTIVITY DUE TO SHALINESS OF EARTH FORMATIONS UTILIZING DIELECTRIC CONSTANT MEASUREMENTS

[75] Inventors: Wynn P. Rickey, Algiers, La.; Robert C. Rumble, Forsyth, Ga.; Wilmer A. Hoyer, Houston, Tex.

[73] Assignee: Exxon Production Research Company, Houston, Tex.

[22] Filed: July 12, 1974

[21] Appl. No.: 488,113

Related U.S. Application Data

[63] Continuation-in-part of Ser. No. 210,096, Dec. 20, 1971, abandoned, which is a continuation-in-part of Ser. No. 4,969, Jan. 22, 1970, abandoned.

[52] U.S. Cl. .................... 324/1; 73/152; 324/13
[51] Int. Cl. .................... G01v 3/18; G01v 3/06
[58] Field of Search .................. 324/1, 5, 7, 10, 13; 23/230 EP; 73/152, 153

[56] References Cited
UNITED STATES PATENTS

| | | | |
|---|---|---|---|
| 2,400,420 | 5/1946 | Horvitz | 23/230 EP |
| 2,592,101 | 4/1952 | Aiken | 324/1 |
| 2,689,329 | 9/1954 | Zimmerman | 324/5 |
| 2,749,503 | 6/1956 | Doll | 324/1 |
| 2,766,421 | 10/1956 | Wait et al. | 324/1 |
| 2,772,951 | 12/1956 | Bond | 23/230 EP |
| 2,963,642 | 12/1960 | Arbogast et al. | 324/13 |
| 3,237,094 | 2/1966 | Blackburn et al. | 324/1 |

FOREIGN PATENTS OR APPLICATIONS

| | | | |
|---|---|---|---|
| 1,088,824 | 10/1967 | United Kingdom | 324/5 |

*Primary Examiner*—Gerard R. Strecker

[57] ABSTRACT

The effects of shaliness on the electrical resistivity (or conductivity) of earth formations is determined by obtaining a relationship between dielectric constant and a conductivity parameter that is a function of shaliness, measuring the dielectric constant of the earth formation of interest and using the relationship between dielectric constant and the conductivity parameter to determine the effects of shaliness on resistivity. The dielectric constant of portions of formations can be determined in-situ by electrical measurements, or by obtaining earth cores and subjecting the cores to electrical measurements.

15 Claims, 10 Drawing Figures

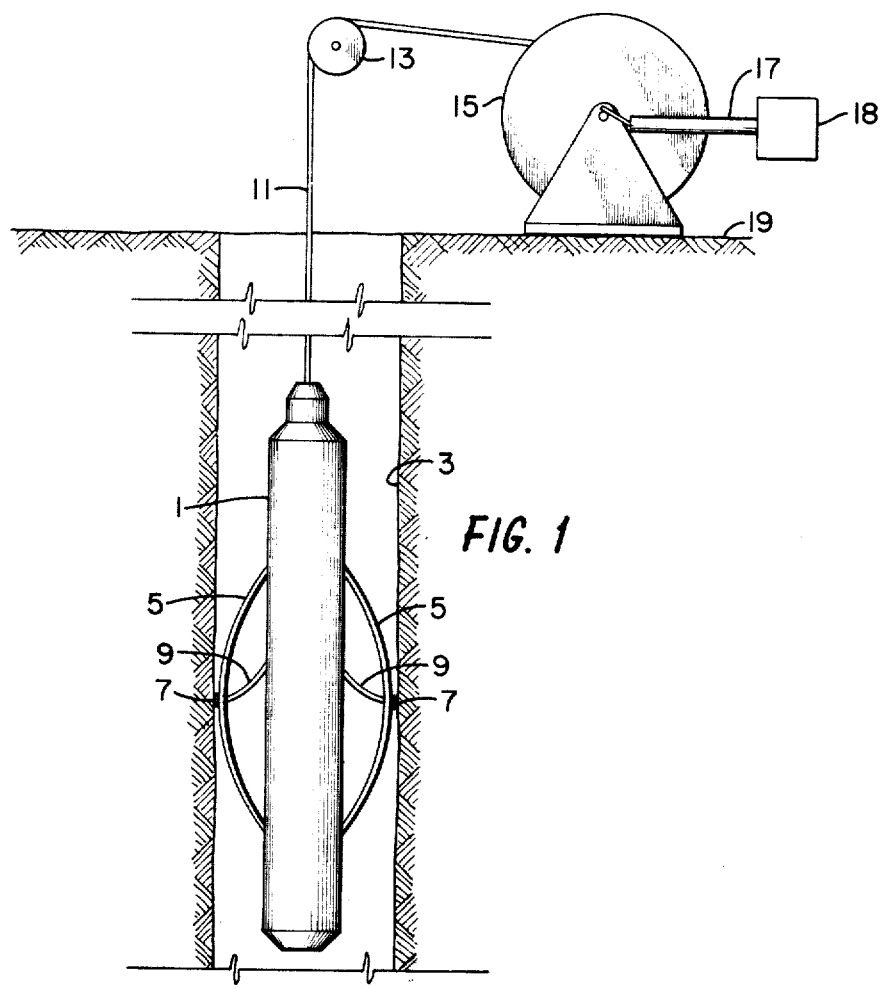
FIG. 1
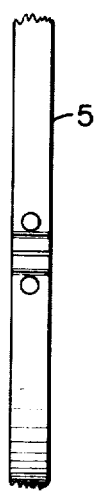
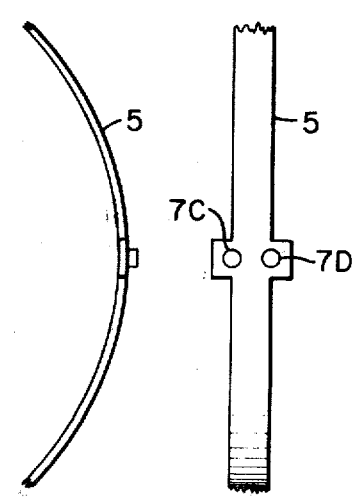
FIG. 2A  FIG. 2B  FIG. 2C  FIG. 2D
Wynn P. Rickey
Robert C. Rumble
Wilmer A. Hoyer

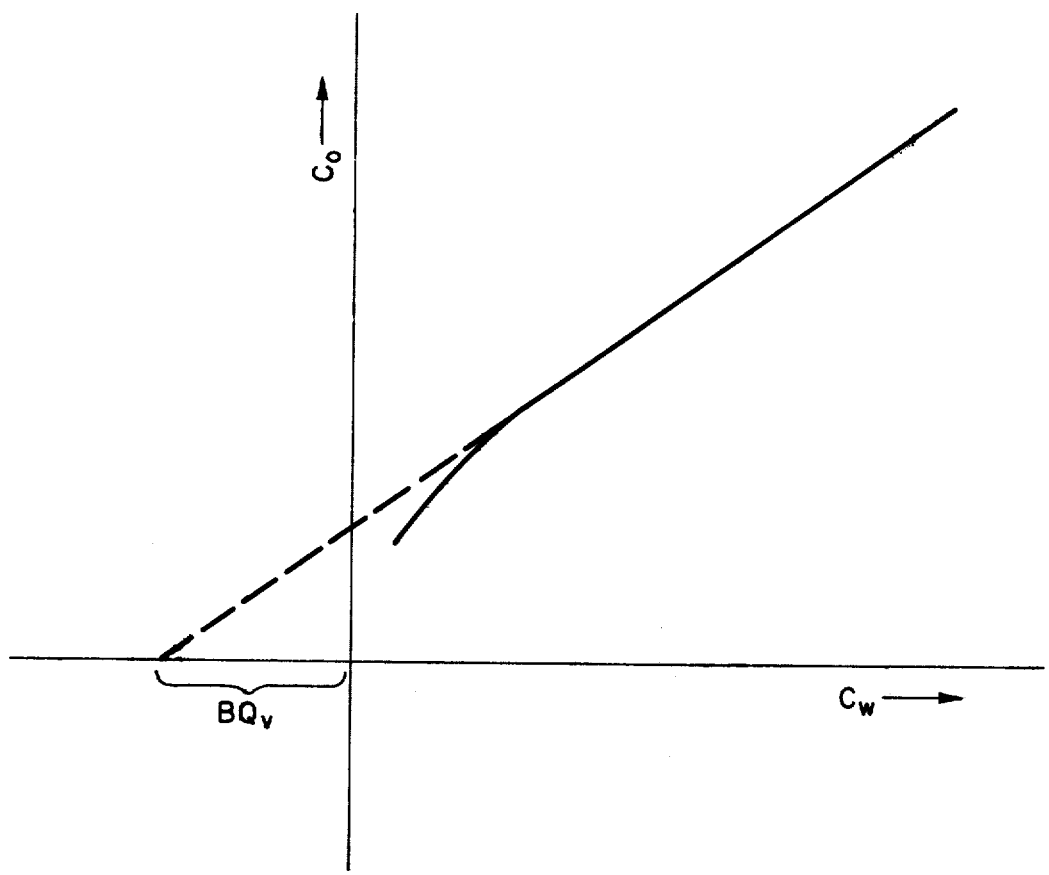
FIG. 6    CORE CONDUCTIVITY ($C_o$) AS A FUNCTION OF EQUILIBRATING SOLUTION CONDUCTIVITY ($C_w$)

DETERMINATION OF ELECTRICAL RESISTIVITY DUE TO SHALINESS OF EARTH FORMATIONS UTILIZING DIELECTRIC CONSTANT MEASUREMENTS

CROSS-REFERENCE TO RELATED APPLICATIONS

This application is a continuation-in-part of copending application Ser. No. 210,096 filed Dec. 20, 1971, now abandoned, which was a continuation-in-part of application Ser. No. 4969 filed Jan. 22, 1970 which was pending on Dec. 30, 1971, now abandoned.

BACKGROUND OF THE INVENTION

This application relates to the determination of the effects of shaliness on the electrical resistivity of earth formations.

One of the procedures typically employed to determine the presence of oil in earth formations is to electrically log boreholes drilled in these formations. Normally, formations having a high brine saturation will exhibit a low electrical resistivity, while formations having a high oil saturation will have a high electrical resistivity. While these relationships are generally the case, frequently earth formations having high oil saturation also have low resistivity. For example, a portion of one formation offshore Louisiana has a resistivity of less than 1 ohm-meter, while another portion has a resistivity of 10 to 15 ohm-meters. Conventional electrical log analysis would indicate that the brine saturation of the low resistivity portion of the formation is too high for it to be commercially productive, yet both portions are commercially productive. The low resistivity (or high conductivity) of such producing formations is usually attributable to shaliness of the formation.

In recent years, it has been determined that the cation exchange capacity per unit pore volume, caused by shaliness, accounts for the high conductivity of certain oil-bearing earth formations. However, prior art methods of determining the cation exchange capacity involve obtaining core samples from earth formations and performing chemical analysis in the laboratory for each core sample. Such laboratory procedures are quite time consuming and also result in the destruction of the core samples so that they are unavailable for further analysis. As a result, the expense of measuring cation exchange capacity in accordance with prior art techniques is quite high and demands a large amount of manpower. The determination of cation exchange capacity per unit pore volume as it has been practiced in the past is not adapted for use with electrical well logging on a routine basis.

SUMMARY OF THE INVENTION

In accordance with the teachings of this invention, the dielectric constant of earth formations, when measured at frequencies less than about 50 KHz, is related to cation exchange capacity per unit pore volume, $Q_v$, and to the conductivity parameter, $BQ_v$. The dielectric constant of core samples of various clay-containing earth material is first measured, and tests are then conducted on these samples to determine the value of the conductivity parameter, $BQ_v$, to establish the relationship between dielectric constant and the conductivity parameter. During well logging, dielectric constant measurements are made at a plurality of levels in the borehole. These measured values of dielectric constant are correlated with the previously established relationship between dielectric constant and the conductivity parameter to determine the effects of shaliness on formation resistivity.

BRIEF DESCRIPTION OF THE DRAWINGS

In the drawings:

FIG. 1 is a schematic representation of logging equipment arranged in a borehole and at the earth's surface to conduct earth measurements in accordance with the present invention;

FIGS. 2A and 2B illustrate side and front views of a bow spring for use with the logging sonde of FIG. 1;

FIGS. 2C and 2D are side and front of another bow spring suitable for use with the invention;

FIG. 6 is the graphical illustration of core conductivity ($C_n$) as a function of equilibrating solution conductivity ($C_\omega$).

DESCRIPTION OF THE PREFERRED EMBODIMENT

Figure 3A:
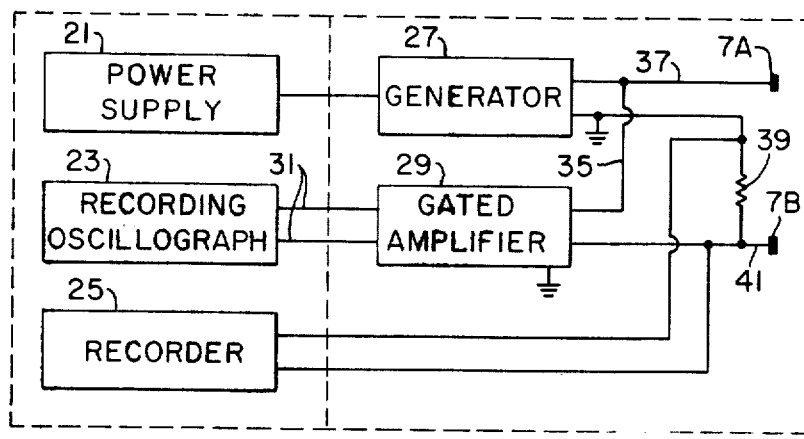
FIG. 3A is an electrical diagram, partially schematic and partially in block form, of electrical equipment suitable for use in connection with the equipment of FIGS. 1, 2A, 2B, 2C, and 2D.

FIG. 1 illustrates apparatus for performing this invention. The function of the apparatus is to apply an electrical signal to the borehole location and to provide an output signal from which shaliness effects can be determined. The apparatus is comprised of an elongated housing 1 to which is affixed in the usual manner a number of bow springs 5 each of which carries a plurality of electrode contacts 7A and 7B (see FIGS. 2A and 2B) positioned on the bow springs so as to be urged into contact with the walls of a borehole 3. The housing 1 is suspended from a logging cable 11 which is wound on a reel drum 15 and which extends over a sheave 13 in the usual manner so as to be suitably positioned in the borehole. It is to be understood that the usual wellhead equipment, such as lubricators, may also be utilized but that such have been eliminated from the drawings as they have no bearing on the present invention. The electrical leads within the logging cable 11 are connected to electrical leads within an electrical conduit 17 in the usual manner. The latter leads are further connected to suitable recording or display apparatus 18 at the earth's surface which may be a conventional well logging recorder, such as a recording oscillograph.

The electrodes 7A and 7B on the bow springs 5 are supported by electrical insulators and are spaced apart a sufficient distance so that electrical currents flowing therebetween will penetrate a desired distance into the earth formations with which they come in contact. The electrodes 7A and 7B may be either vertically spaced apart as illustrated in FIG. 2A or horizontally spaced apart as illustrated in FIG. 2D. The electrodes 7A and 7B are connected to electrical leads 9 which are electrically insulated from any borehole fluids and which lead within the housing 1 to apparatus that will be discussed below.

With reference now to FIG. 3A there is illustrated an electrical schematic diagram, partially in block form, of apparatus suitable for use with the apparatus previously described for carrying out the present invention. The apparatus shown in FIG. 3A is divided into two sections; namely, the surface equipment and the downhole equipment. The surface equipment is connected to the cable 17 and interconnected with the downhole equipment through cables 17, 11 and electrical leads inside the housing 1. The surface equipment includes a power supply 21 which preferably is a DC supply, a recording oscillograph 23 and a recorder 25 for making a time recording of a voltage derived from the downhole equipment. The power supply 21 is electrically connected through the cables 17 and 11 to a rectangular wave generator 27 within the housing 1. The rectangular wave generator 27 may be a multivibrator. The output of the generator is connected by lead 37 to a contact member 7A (assuming that the configuration of FIG. 2A is used), and through a resistor 39 of low resistance to contact member 7B. The contact electrodes 7A and 7B are designed to have a very large contact area with the earth formation so that the contact impedance will be quite low. The contact electrodes may be platinized electrodes having sufficient diameter to minimize contact impedance by making the contact resistance and the contact impedance as low as possible. (The combination of the contact and the borehole wall is the equivalent of a resistor and a capacitor in parallel.)

The voltage appearing across resistor 39 is applied to the input of gated amplifier 29. A gating signal is derived from lead 37 of generator 27 so that, in effect, the output voltage of generator 27 switches the amplifier 29 on and off. The output signals of the gated amplifier are applied through leads 31 to the recording oscillograph 23 in the surface equipment. The voltage appearing across resistor 39 is also transmitted to the earth's surface to be recorded by recorder 25. If desired, and if the recording oscillograph is provided with sufficient input circuits, the signal appearing across resistor 39 and the signal appearing between contact 7B and ground may be simultaneously recorded by recording oscillograph 23.

To calibrate the instrument, it is necessary to perform certain preliminary operations. Initially a number of earth samples having a wide range of dielectric constants are obtained. Such samples may have been previously obtained from coring operations in the earth, or they may be specially obtained for the purpose of calibrating the instrument. The dielectric constant of each of the samples is then obtained by techniques well known to the art such as described in the texts: "Solid State Magnetic and Dielectric Devices," Library of Congress Catalog Card Number 59-6769, John Wiley & Sons, New York, 1959; and "Theory of Dielectrics" by H. Frohlich, University Press, Oxford, 1958. For example, an earth sample may be placed between conductive plates of known dimensions and the capacitive reactance of the capacitor resulting therefrom can then be measured. The dielectric constant of the earth sample can be calculated from the area of the plate and the spacing between the plates. Such techniques have been well known to the art for many years and will not be further discussed herein.

Figure 4:
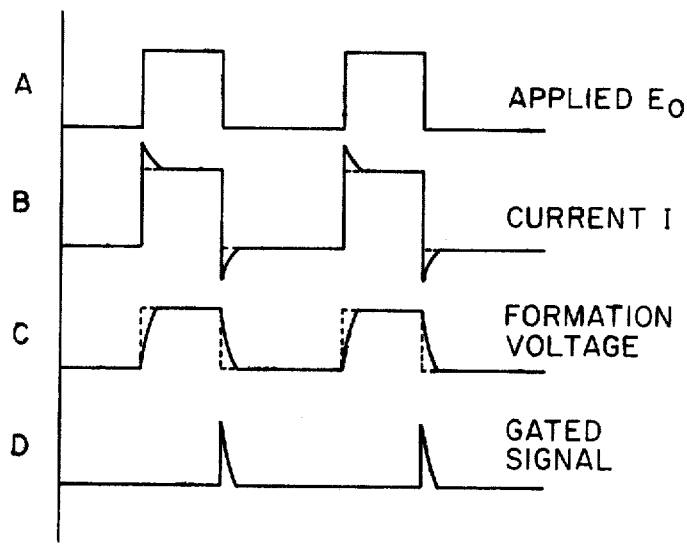
FIG. 4 is a wave form diagram useful in understanding the circuit of FIG. 3A.

After the dielectric constant of the various earth samples have been obtained, these samples or earth samples obtained from the same formations, having the same dielectric constant, are placed in contact with the contacts 7A and 7B. The thickness of each formation sample should be great enough so that electric lines of force between the pairs of contacts will pass only through the formation sample. The equipment illustrated in FIG. 3A is then actuated so that a substantially rectangular wave pulse train with a frequency spectrum predominantly less than 50 KHz, as illustrated in FIG. 4A, is generated by generator 27.

Because of the capacitive reactance between the contacts 7A and 7B resulting from the effective capacitor produced by the contacts and the core samples in contact therewith, the current passing through resistor 39 will lead the voltage produced by generator 27. The contact impedance of contacts 7A and 7B is very low and will not introduce significant errors into the measurements. The capacitive reactance will be produced almost entirely by the effective capacity, $C_f$, of the earth sample. The dotted lines in FIG. 4B illustrate the wave form that would be produced were there no capacitive reactance in the circuit. The solid rule line represents the current wave form that will typically be produced.

Figure 3B:
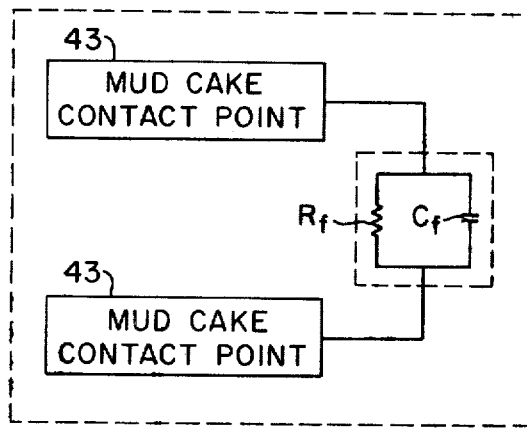
FIG. 3B is an electrical diagram illustrating the equivalent electrical circuit formed by mudcake and an earth formation during an electrical resistivity measurement in a borehole useful in understanding the operation of the apparatus of FIG. 3A.

The electrical characteristics of the formation sample can be represented by a capacitive component $C_f$ and a resistive component $R_f$ in parallel as illustrated in FIG. 3B. The current from generator 27 flows through the sample and through resistor 39. Designating the voltage across resistor 39 as $V_r$ and the resistance value of resistor 39 as R, it is apparent that $$I = \frac{V_r}{R}.$$

If the voltage produced by generator 27 is designated as $E_o$, then the formation sample resistance $R_f$ is given by $$R_f = \frac{E_o - V_r}{I} = \frac{(E_o - V_r)R}{V_r}.$$

From the above it can be seen that the effective resistance of the formation can be determined from the recordations of the voltage generated by generator 27, from the voltage produced across resistor 39, and the resistance of resistor 39. In the above formula the quantity $V_r$ would be the voltage recorded by recorder 25 and the formation voltage $E_o - V_r$ would be the gated voltage appearing at the output of gated amplifier 29 as recorded by recording oscillograph 23.

Manifestly, the time integral "T" of each voltage pulse appearing at the output of generator 29 and illustrated by the wave form of FIG. 4D is given by the formula:

$$T = IR(R_{eff}C_f)$$

where $$R_{eff} = \frac{R_f R}{R_f + R}$$

so that

-Continued $$C_f = \frac{T}{IRR_{eff}} = \frac{TE_a}{V_rR(E_a - V_r)}$$

From the above it is apparent that the capacitance of an earth sample can be measured using the apparatus described above. To calibrate the apparatus for dielectric constant, a number of earth samples of known dielectric constant are successively placed in contact with the electrodes and the area of the integrated signal (which is the time integral "T") recorded by oscillograph 23 is measured for each sample. Thus there is obtained a relationship between the integral of the gated signal and the dielectric constant of the earth samples placed between the electrodes. The dielectric constant of any unknown earth sample can be obtained by measuring the parameters described above and correlating with the calibration curve.

It has been determined that the dielectric constant, measured at frequencies less than about 50 KHz, is proportional to $Q_v$, the cation exchange capacity per unit pore volume.

For the purpose of establishing the relationship between dielectric constant and resistivity (or conductivity) due to shaliness, earth samples whose dielectric constant have been determined are now subjected to laboratory analysis for the purpose of determining the cation exchange capacity per unit pore volume of these samples. The particular laboratory analysis to which the earth samples are subjected is not part of the invention and may be any standard known prior art type of analysis such as has been described and shown to be useful in the paper entitled "Electrical Conductivities in Oil Bearing Shaly Sands" by M. H. Waxman and L. J. M. Smits, Society of Petroleum Engineers Journal, June, 1968, page 107. One particular method commonly used in the prior art comprises repeated equilibration of crushed rock samples with concentrated barium chloride solutions, washing to remove excess barium ions, followed by conductometric titration with standard $M_gSO_4$ solution. The latter procedure is also described in the article "Conductometric Titration of Soils for Cation Exchange Capacity" by M. M. Mortland and J. L. Mellor, Proc. Soil Science Society of America, (1954), Column 18, page 363. Another technique that may be used involves chromatographic measurements using ammonium acetate solutions as described in the article "Effect of Clay and Water Salinity on Electro-Chemical Behavior of Reservoir Rocks" by H. J. Hill and J. D. Millburn, appearing in Transactions of the AIME, (1956), Volume 207, pages 65-72.

The conductivity equation for brine saturated shaly sands is as follows:

$$C_n = \frac{1}{F^*}(C_\omega + BQ_v)$$

The paper entitled "Electrical Conductivities in Oil Bearing Shaly Sands" by M. H. Waxman and L. J. M. Smits, Society of Petroleum Engineers Journal, June, 1968, page 107 describes the theoretical basis for this equation. In the equation, the terms have the following meanings:

$C_o$ = specific conductivity of sand, 100 percent saturated with aqueous salt solution, mho cm$^{-1}$ $F^*$ = formation resistivity factor for shaly sand, which has been found to be related to porosity, $\phi$, by what is known as Archie's first empirical equation $$F^* = \phi^{-m}$$

(See Archie, G. E. "The Electrical Resistivity Log as an Aid in Determining Some Reservoir Characteristics," Trans., AIME (1942) Vol. 146, p. 54-67. The constant, m, has a value of approximately 2, but varies somewhat depending on the sand characteristics.)

$C_\omega$ = specific conductivity of the saline solution, mho cm$^{-1}$ $Q_v$ = cation exchange capacity per unit pore volume, meq ml$^{-1}$ B = equivalent conductance of clay exchange cations as a function of $C_\omega$ at 25°, mho cm$^2$ meq$^{-1}$ FIG. 6 graphically illustrates the change in the conductance of brine saturated shaly sand with increasing conductivity of the saturating solution. It is evident from FIG. 6 that except for very low salinity levels the relationship between $C_o$, the saturated sand conductance, and $C_\omega$, the saturating solution conductance, is linear, and the value of B in this range is a constant. Subsequently the value of B will be treated as a constant since this introduces very little error.

As stated earlier, the dielectric constant, measured at frequencies less than about 50 KHz, is proportional to $Q_v$, the cation exchange capacity per unit pore volume. And with B being treated as a constant, it is also proportional to $BQ_v$. It is evident from the equation that the shaliness effects on conductivity are accounted for by the term $BQ_v$.

The conductivity of a number of water saturated shaly samples, having known values for $Q_v$, is determined at different levels of salinity. The relationship between the conductivity of the saline solution alone and the conductivity of the water saturated shaly samples will appear similar to FIG. 6. The projection of the straight portion of the line on the horizontal axis represents the value of $BQ_v$. The values of $BQ_v$ vs. $Q_v$ are plotted and from this graph, the value of $BQ_v$ for the earth formations of interest can be obtained as a function of $Q_v$, the cation exchange capacity.

As an alternative to the preceding method of determining a value of $BQ_v$ as a function of dielectric constant, the initial step of determining the value of $Q_v$, alone, can be skipped, and the process for determining the value of $BQ_v$ can be employed on each of the samples after the value of dielectric constant is measured. Thus there is obtained a relationship between dielectric constant and the conductivity parameter, $BQ_v$. Because this method requires only one laboratory analysis rather than two for determining a value for $BQ_v$ it may be advantageous.

The apparatus described above with respect to FIGS. 1, 2, and 3A may now be lowered into a borehole as illustrated in FIG. 1 and measurements made at various levels in the borehole in order to determine the dielectric constant of the borehole at various levels therein as described above. The equipment will be activated at each level, and the records made on the recording oscillograph 23 and recorder 25 will be taken at each level.

A record made at a given level by the oscillograph 23 is now integrated to obtain the area under a typical gated signal on the record, and this area is used to obtain the dielectric constant of the formation by correlating it with the calibration obtained as described above using earth samples of known dielectric constants. The dielectric constant thus obtained will be indicative of the resistivity effects due to shaliness of the formation at the level at which the measurements corresponding thereto was taken. Shaliness effects are determined by correlating the dielectric constant and cation exchange capacity, $Q_\nu$, and/or the conductivity parameter $BQ_\nu$ obtained using the earth samples of known dielectric constant, as described above.

The technique described above can be repeated from borehole to borehole as long as equipment is used wherein the generator 27 generates a wave form having the same given frequency spectrum under operating conditions.

After the borehole measurements are made, it can be determined whether shaliness effects must be considered or whether they are negligible. The importance of shaliness can be determined using the conductivity relationship:

$$C_o = \frac{1}{F^*}(C_\omega + BQ_\nu)$$

Rewriting this equation in terms of the ratio between saturated sand conductivity, $C_o$, and saturating solution conductivity, $C_\omega$, $$\frac{C_o}{C_\omega} = \frac{1}{F^*}\left(1 + \frac{BQ_\nu}{C_\omega}\right)$$

it is evident that if the value of the term $BQ_\nu/C_\omega$ is substantially less than 1, shaliness effects may be neglected. During the drilling process, drilling fluids will replace whatever saturating fluids were present in the formation at the wellbore surface where the tests required for this invention will be made. The value of $C_\omega$ for the saturating solution will either be known from the characteristics of the drilling fluids or must be measured by techniques well known to the art.

After the electrical measurements as described in this invention are made, the value of B, $Q_\nu$, and $C_\omega$ are known and shaliness effects can be determined. Typically, if the value of $BQ_\nu/C_\omega$ is less than 0.1, shaliness may be neglected, but this is a decision that must take economic factors into account.

A precise value for the conductivity due to shaliness can be calculated from the term $BQ_\nu/F^*$. This requires knowledge of the value of the formation resistivity factor, but methods for determining this value are well known to the art, and are routinely determined for each formation.

Figure 5:
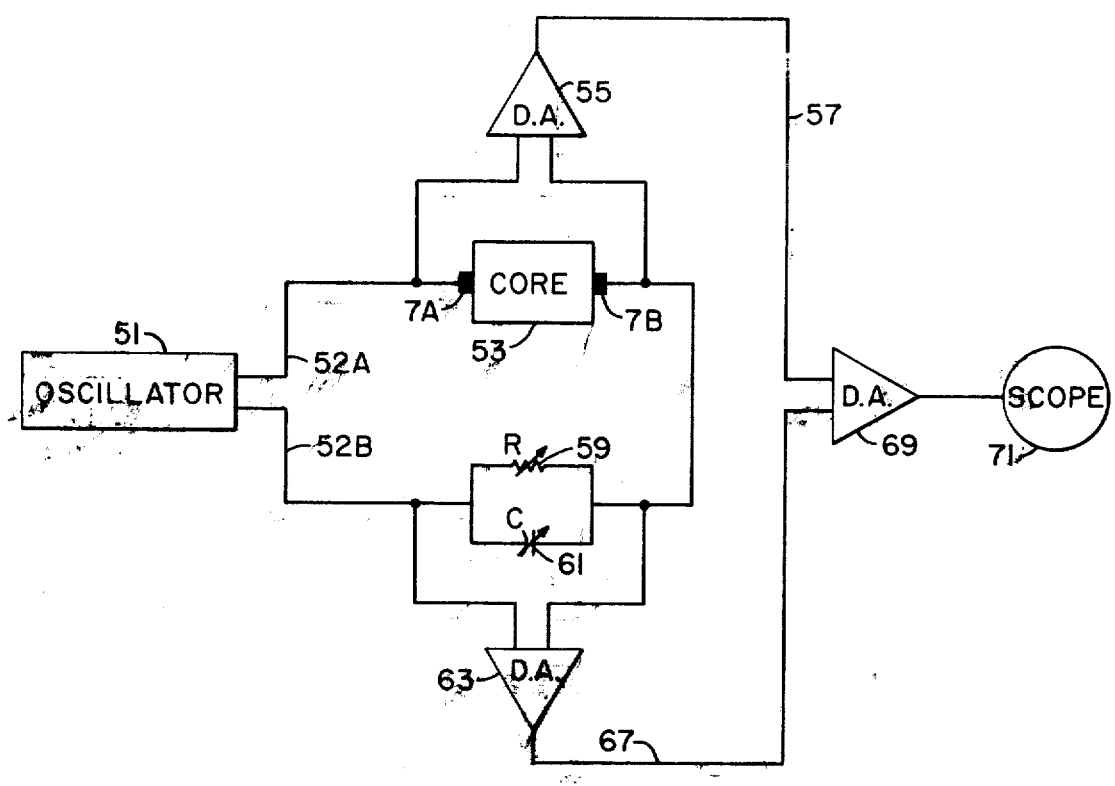
FIG. 5 is an electrical diagram, partially in schematic form and partially in block form, illustrating other measuring apparatus suitable for use with the invention.

Another form of apparatus that may be used for obtaining dielectric constant is illustrated in FIG. 5. This apparatus is particularly suitable for measuring the dielectric constant of a core and also may be used with the apparatus of FIG. 1 to replace the apparatus of FIG. 3A. With reference to FIG. 5, it is assumed that an earth core is under analysis for determining the effective resistance and capacitive reactance presented thereby. An oscillator 51 is provided for generating an output signal having a known wave form, preferably a sinusoidal wave form of known, stable frequency below 50 KHz. The output signal of the oscillator is applied to a series circuit including core 53 and parallel connected variable resistor 59 and variable capacitor 61. Contact is made with the core by terminals 7A and 7B which may be found as described above with respect to FIGS. 2A and 2B. Preferably the contacts are of very low impedance in order to present minimum reactance in the series circuit. The voltage across core 53 is connected to a differential amplifier 55, and the voltage across the parallel connected capacitor 61 and resistor 59 is connected to differential amplifier 63. The output signals of the differential amplifiers 55 and 63 are connected to the input circuits of a differential amplifier 69, the output signal of which is connected to an oscilloscope 71. When the oscillator 51 is activated, the resistance of resistor 59 and the capacitance of capacitor 61 are varied until the signal appearing on oscilloscope 71 indicates that the resistance of resistor 59 and capacitor 61 is the same as the effective resistance and capacitance of core 53. When the voltages applied to the differential amplifier 69 have the same wave form, no signal will appear at the output of amplifier 69 to be indicated by oscilloscope 71.

By using a number of cores of known dielectric constant in the circuit described above, a dielectric constant calibration of circuit can be obtained. Also, by connecting the apparatus to electrodes of a logging device as illustrated in FIG. 1, the same measurements can be made within a borehole.

We claim:

1. A method of determining an electrical conductivity parameter reflecting the shaliness of a portion of an earth formation, which comprises:
    measuring the dielectric constant of said portion of an earth formation at frequencies predominantly lower than about 50 KHz; and
    determining the value of said electrical conductivity parameter by comparing the measured dielectric constant with a correlation relating dielectric constant to said electrical conductivity parameter.

2. The method of claim 1 wherein said electrical conductivity parameter is the term, $Q_\nu$, from conductivity relationship:

$$C_o = \frac{1}{F^*}(C_\omega + BQ_\nu)$$

wherein:
    $C_o$ = specific conductivity of sand, 100 percent saturated with aqueous salt solution, mho cm$^{-1}$;
    $F^*$ = formation resistivity factor for shaly sand;
    $C_\omega$ = specific conductivity of the aqueous salt solution, mho cm$^{-1}$;
    $Q_\nu$ = cation exchange capacity per unit pore volume, meq ml$^{-1}$; and
    B = equivalent conductance of clay exchange cations as a function of $C_\omega$ at 25°C, mho cm$^2$ meq$^{-1}$.

3. The method of claim 1 wherein said electrical conductivity parameter is the term, $BQ_\nu$, from the conductivity relationship:

$$C_o = \frac{1}{F^*}(C_\omega + BQ_\nu)$$

wherein:
    $C_o$ = specific conductivity of sand, 100 percent saturated with aqueous salt solution, mho cm$^{-1}$;
    $F^*$ = formation resistivity factor for shaly sand;

$C_\omega$ = specific conductivity of the aqueous salt solution, mho cm$^{-1}$;

$Q_\nu$ = cation exchange capacity per unit pore volume, meq ml$^{-1}$; and

B = equivalent conductance of clay exchange cations as a function of $C_\omega$ at 25°C, mho cm$^2$ meq$^{-1}$.

4. The method of claim 2 wherein dielectric constant is measured by the following steps:

subjecting a plurality of earth samples having known dielectric constants to an electrical voltage waveform having a frequency spectrum predominantly less than about 50 KHz;

subjecting said portion of the earth formations to said electrical voltage waveform; and correlating the capacitive reactance effects of said earth samples and of said earth formation portion on the current passing therethrough as a result of applications of said voltage waveform to obtain the dielectric constant of said portion of the formation.

5. The method of claim 2 wherein the dielectric constant of said earth formation is measured by the following steps:

a. measuring the distributed capacitive reactance presented by earth samples of known dielectric constant;

b. measuring the distributed capacitive reactance presented by said earth formation portion; and c. correlating the measurement of step (b) with the measurement of step (a) to obtain the dielectric constant of said earth formation sample.

6. The method of claim 2 wherein the portion of the formation is adjacent to the wall of a borehole in the earth.

7. The method of claim 3 wherein dielectric constant is measured by the following steps:

subjecting a plurality of earth samples having known dielectric constants to an electrical voltage waveform having a frequency spectrum predominantly less than about 50 KHz;

subjecting said portion of the earth formations to said electrical voltage waveform; and correlating the capacitive reactance effects of said earth samples and of said earth formation portion on the current passing therethrough as a result of applications of said voltage waveform to obtain the dielectric constant of said portion of the formation.

8. The method of claim 3 wherein the dielectric constant of said earth formation is measured by the following steps:

a. measuring the distributed capacitive reactance presented by earth samples of known dielectric constant;

b. measuring the distributed capacitive reactance presented by said earth formation portion; and c. correlating the measurement of step (b) with the measurement of step (a) to obtain the dielectric constant of said earth formation sample.

9. The method of claim 3 wherein the portion of the formation is adjacent the wall of a borehole in the earth.

10. A method of determining the significance of shaliness of a portion of an earth formation on electrical resistivity of said portion of an earth formation, said portion of an earth formation being adjacent a borehole and saturated with a fluid solution having a known specific conductivity, $C_\omega$, which comprises:

measuring the dielectric constant of said portion of an earth formation at frequencies predominantly lower than about 50 Khz;

determining the value of an electrical conductivity parameter, $BQ_\nu$, by comparing the measured dielectric constant with a correlation relating dielectric constant to said electrical conductivity parameter;

determining the value of the term, $BQ_\nu/C_\omega$, from the relationship $$\frac{C_o}{C_\omega} = \frac{1}{F^*}\left(1 + \frac{BQ_\nu}{C_\omega}\right)$$

wherein:

$C_o$ = specific conductivity of sand, 100 percent saturated with aqueous salt solution, mho cm$^{-1}$;

$F^*$ = formation resistivity factor for shaly sand;

$C_\omega$ = specific conductivity of the aqueous salt solution, mho cm$^{-1}$;

$Q_\nu$ = cation exchange capacity per unit pore volume, meq ml$^{-1}$; and

B = equivalent conductance of clay exchange cations as a function of $C_\omega$ at 25°C, mho cm$^2$ meq$^{-1}$ to determine the significance of shaliness on electrical resistivity of said portion of the formation.

11. A method for determining the electrical conductivity due to shaliness of a portion of an earth formation having a known formation resistivity factor, F*, which comprises:

measuring the dielectric constant of said portion of an earth formation at frequencies lower than about 50 KHz;

determining the value of an electrical conductivity parameter, $BQ_\nu$, by comparing the measured dielectric constant with a correlation relating dielectric constant to said electrical conductivity parameter;

employing the term, $BQ_\nu/F^*$, from the relationship $$C_o = \frac{1}{F^*}(C_\omega + BQ_\nu)$$

wherein $C_o$ = specific conductivity of sand, 100 percent saturated with aqueous salt solution, mho cm$^{-1}$;

$F^*$ = formation resistivity factor for shaly sand;

$C_\omega$ = specific conductivity of the aqueous salt solution, mho cm$^{-1}$;

$Q_\nu$ = cation exchange capacity per unit pore volume, meq ml$^{-1}$; and

B = equivalent conductance of clay exchange cations as a function of $C_\omega$ at 25°C, mho cm$^2$ neq$^{-1}$ to determine the value of electrical conductivity due to shaliness.

12. The method of claim 11 wherein the portion of an earth formation is adjacent to the wall of a borehole in the earth.

13. A method of measuring the cation exchange capacity per unit pore volume of a portion of an earth formation comprising:

measuring the dielectric constant of said portion of the formation at at least one frequency less than 50 KHz;

obtaining the variation in cation exchange capacity as a function of dielectric constant for clay-containing earth materials; and correlating the measured dielectric constant of said portion of the formation with the variation in cation exchange capacity as a function of dielectric constant so obtained to obtain the cation exchange capacity per unit pore volume of said portion of the formation.

14. The method of claim 6 wherein dielectric constant is measured by the following steps:

subjecting a plurality of earth samples to an electrical voltage of predetermined frequency spectrum, said earth samples having known dielectric constant at the frequency of said voltage;

subjecting said portion of the earth formation to said electrical voltage of known frequency spectrum; and correlating the capacitive reactance effects of said earth samples and of said earth formation portion on the current passing therethrough as a result of application of said voltage thereto to obtain the dielectric constant of said portion of the formation.

15. The method of claim 6 wherein the dielectric constant of said earth formation is measured by the following steps:

a. measuring the distributed capacitive reactance presented by earth samples of known dielectric constant;

b. measuring distributed capacitive reactance presented by said earth formation portion; and c. correlating the measurement of step (b) with the measurement of step (a) to obtain the dielectric constant of said earth formation sample.

* * * * *